UNITED STATES PATENT OFFICE.

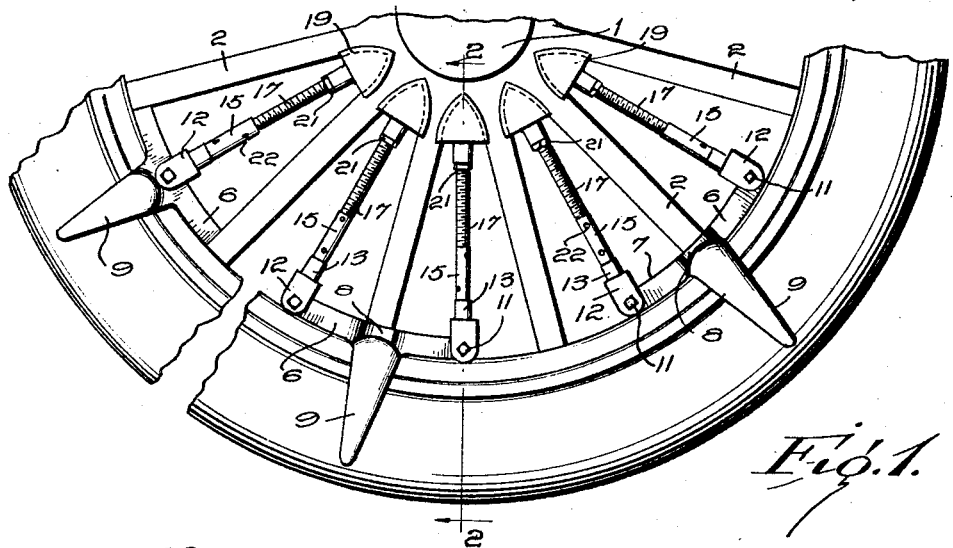
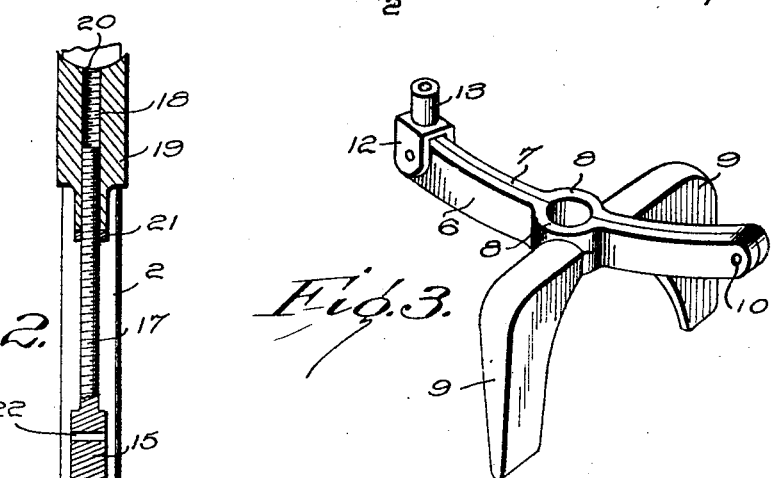
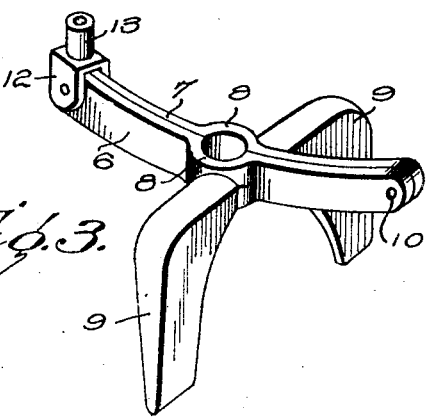
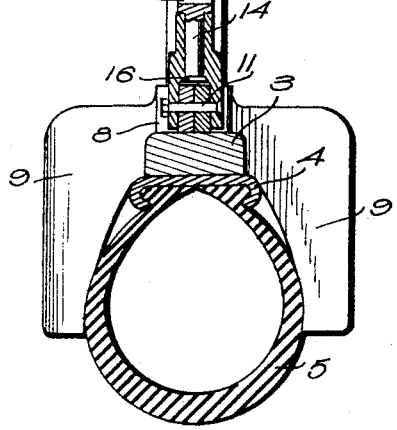

WILLIAM LEVY, OF PATERSON, NEW JERSEY.

TRACTION LUG.

1,403,610.  Specification of Letters Patent.  Patented Jan. 17, 1922.

Application filed December 3, 1921. Serial No. 519,749.

*To all whom it may concern:*

Be it known that I, WILLIAM LEVY, a citizen of the United States, residing at Paterson, in the county of Passaic and State of New Jersey, have invented certain new and useful Improvements in Traction Lugs, of which the following is a specification.

This invention relates to traction lugs, and is an improvement over the construction shown in the patent to William Levy and Michael Cortese, No. 1,369,623, dated February 22nd, 1921.

In the said patent, there is disclosed and claimed a traction lug consisting of a pair of complementary sections having a spoke receiving recess, and arms carried by said sections and extending in opposite directions.

In the present invention, I provide a traction lug of the same general type having supporting means consisting of threaded rods secured to the arms and adapted to be received in a threaded bore formed in a head which is provided with a groove for the reception of a portion of a pair of adjacent spokes. By properly extending the head on the threaded rod, until a tight fit is obtained, displacement of the parts is prevented.

In the accompanying drawings, I have shown one embodiment of the invention. In this showing:

Figure 1 is a side elevation of a portion of a wheel showing the invention applied, Fig. 2 is a vertical sectional view on line 2—2 of Fig. 1.

Fig. 3 is a perspective view of a traction lug detached, and,

Fig. 4 is a similar view of the spoke engaging head.

Referring to the drawings, the reference numeral 1 designates the hub of a wheel which is provided with spokes 2, and a felly 3. A tire rim 4 is adapted to be arranged on the felly and this rim receives and supports a tire 5.

The traction lug forming the subject matter of the present invention consists of a pair of arms 6 and 7, adapted to be arranged on the inside of the felly and provided with spoke receiving recesses 8. Lugs 9 are carried by these arms and extend outwardly over a portion of the side wall of the tire (see Figures 1 and 2). In the form of the invention shown in Figures 2 and 3 of the drawings, the ends of the arms 6 and 7 are provided with openings 10 for the reception of a pin 11 which passes through a yoke 12, securing the yoke to the end of the arms. This yoke is provided with a sleeve 13 which is adapted to receive the lower reduced end 14 of a rod 15. As shown, the extreme lower end of the reduced portion is flattened as at 16, to prevent displacement of the rod to permit it to revolve within the sleeve. The rod is provided with a threaded portion 17, adapted to be received in a threaded bore 18 of a spoke engaging head 19. As shown, the spoke engaging head is substantially triangular and is adapted to fit into the space between a pair of spokes adjacent the wheel hub. The sides of this member are provided with grooves or recesses 20 shaped to conform to the outer face of the spoke. A nut 21 may be arranged on the threaded portion 17 of the rod to retain the parts in adjusted position. The rod may be provided with openings 22 for the insertion of a suitable tool in tightening the parts.

A yoke 12 may be secured to the arms 6 and 7 at a central point, as shown in Figure 1 of the drawings, in which case the arms are not provided with a spoke receiving recess and are adapted to be arranged between a pair of spokes.

In assembling the device, the arms are first arranged in position and the yokes 12 secured thereto. The head 20 may be threaded on to the rod 15 to shorten the supporting member and permit it to be placed in position. The rod 15 is then revolved to withdraw it from the head 19 and lengthen the supporting member, causing the grooves 20 to engage the sides of the spokes and thus prevent displacement of the parts. The lugs may be quickly assembled and the provision of a threaded extensible supporting member produces the effect of a jack and permits the parts to be properly tightened.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a device of the character described, a pair of arms adapted to be arranged on the inner side of the felly of a wheel, lugs attached to said arms and extending downwardly therefrom, threaded rods secured to said arms, and heads mounted on said rods, said heads being shaped to receive a portion of the adjacent spokes of the wheel.

2. In a device of the character described, a pair of arms adapted to be arranged on the inner side of the felly of a wheel, lugs attached to said arms and extending downwardly therefrom, yokes secured to said arms, sleeves carried by said yokes, a threaded rod rotatably mounted in each of said sleeves, and heads mounted on said rods, said heads being shaped to receive a portion of the adjacent spokes of the wheel.

3. In a device of the character described, a pair of arms adapted to be arranged on the inner side of the felly of a wheel, lugs attached to said arms and extending downwardly therefrom, yokes secured to said arms, sleeves carried by said yokes, a threaded rod rotatably mounted in each of said sleeves, and heads mounted on said rods, said heads being provided with grooves on opposite sides adapted to receive a portion of the adjacent spokes of the wheel.

4. In a device of the character described, a pair of arms adapted to be arranged on the inner side of the felly of a wheel, lugs attached to said arms and extending downwardly therefrom, yokes secured to said arms, sleeves carried by said yokes, a threaded rod rotatably mounted in each of said sleeves, and substantially triangular heads mounted on said rods, said heads being adapted to be received between two spokes adjacent the hub of the wheel to retain the device in position.

In testimony whereof I affix my signature in presence of two witnesses.

WILLIAM LEVY.

Witnesses:
WILLIAM M. FANNING,
R. STEELE.